HANDLE ASSEMBLY FOR CARTRIDGE TAPE PLAYER

Filed Jan. 8, 1968 2 Sheets-Sheet 1

INVENTORS:
RICHARD CULBERTSON,
H. RICHARD OSTRESH,
BY William S Wolfe
THEIR ATTORNEY.

HANDLE ASSEMBLY FOR CARTRIDGE TAPE PLAYER

Filed Jan. 8, 1968 2 Sheets-Sheet 2

INVENTORS:
RICHARD CULBERTSON,
H. RICHARD OSTRESH,
BY William S. Wolfe
THEIR ATTORNEY.

United States Patent Office 3,476,392
Patented Nov. 4, 1969

3,476,392
HANDLE ASSEMBLY FOR CARTRIDGE TAPE PLAYER

Richard Culbertson, New Hartford, and Harvey Richard Ostresh, Dewitt, N.Y., assignors to General Electric Company, a corporation of New York Filed Jan. 8, 1968, Ser. No. 696,224
Int. Cl. G11b 5/78
U.S. Cl. 274—4 8 Claims

ABSTRACT OF THE DISCLOSURE

A cartridge tape player including a retractable handle assembly which captivates the tape cartridge in other than the retracted position and operatively engages a function switch in the retracted position to disengage the cartridge from the tape deck, the handle assembly thus preventing attempts at removal of the cartridge from the tape player when the cartridge is engaged.

Background of invention

Tape players and tape recorders have been employed in the prior art featuring the use of a tape deck adapted to receive a conventional tape cartridge, the cartridge being positioned on the deck on suitable drive hubs and a function switch being utilized to selectively move a drive mechanism and a playback mechanism, e.g. a pinch roller and a magnetic head, into engagement with the cartridge during operation thereof. When the cartridge is to be removed from the deck, the function switch is manipulated to move the pinch roller and magnetic head out of engagement with the cartridge.

However, in the past it has been possible to remove or attempt to remove the cartridge from the tape deck with the function switch in a position whereby the cartridge is engaged by the pinch roller and tape head. This can result in serious damage to the tape deck mechanism.

Thus, it is desirable that such tape decks include means for preventing attempts to remove an engaged cartridge and for automatically moving the tape head and pinch roller out of engagement with the cartridge when the cartridge is to be removed from the tape deck. The prior art did not satisfy this desideratum.

It is further desirable in such devices to provide a carry handle to insure ease of handling by a user.

Accordingly it is an object of the invention to provide an improved cartridge tape player.

Another object is to provide a cartridge tape player wherein attempts at removal of an engaged cartridge are prevented.

A further object is to provide an improved carry handle assembly for a cartridge tape player.

These and other objects are achieved in one embodiment of the invention by providing a retractable handle assembly including a portion overlying and captivating the tape cartridge when the handle is in other than the retracted position. A handle portion of the handle assembly operatively engages a function switch in the retracted position to move the pinch roller and tape head out of engagement with the cartridge. Thus, the cartridge is automatically disengaged when the handle assembly is moved to the retracted position whereby the body portion of the handle assembly no longer captivates the cartridge. The cartridge can accordingly be removed without damage to the tape deck.

Detailed description

Figure 1:
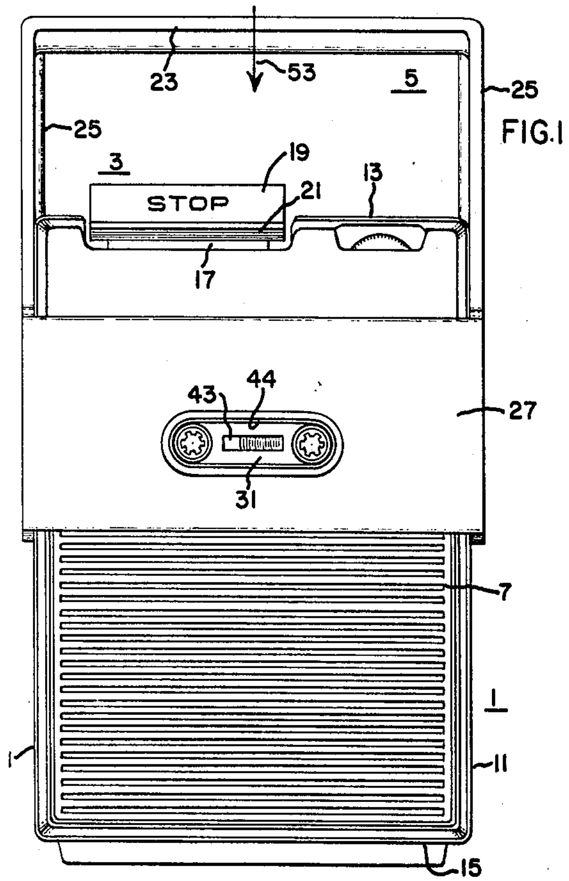
Figures 2, 4, 6:
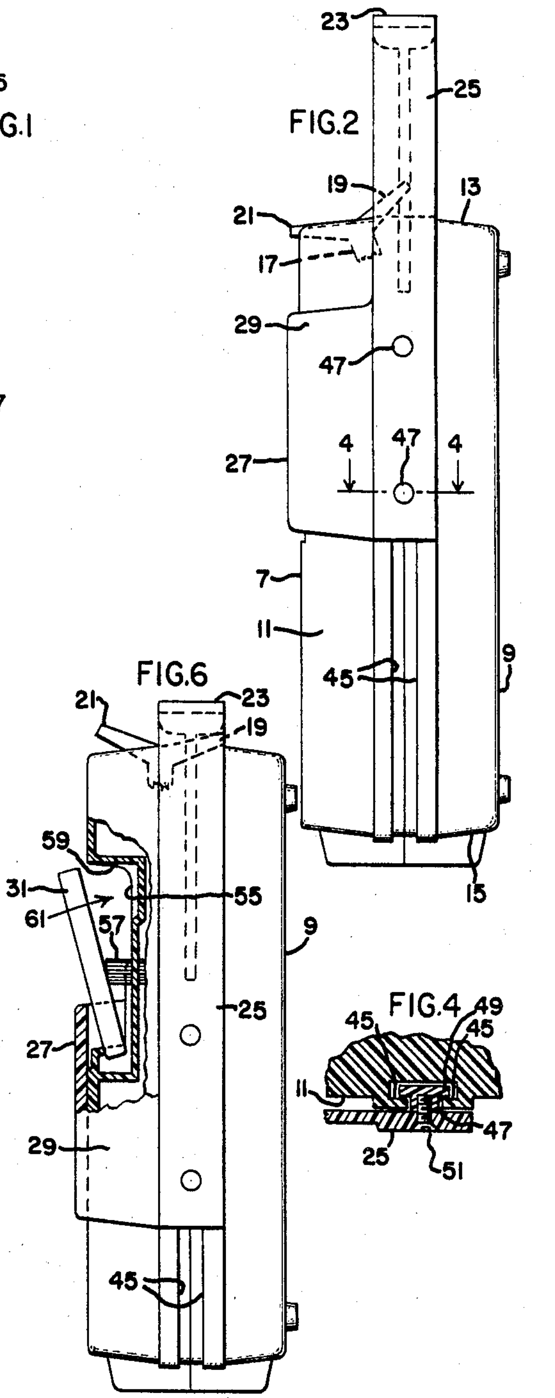
Figure 5:
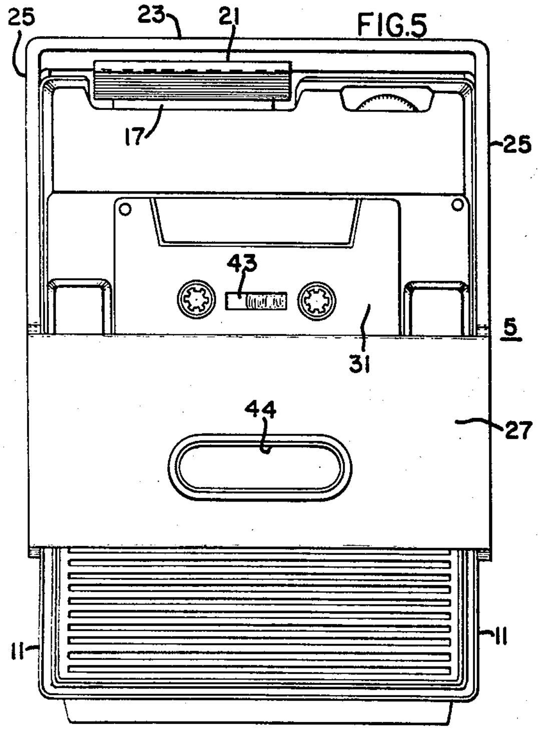
Figure 7:
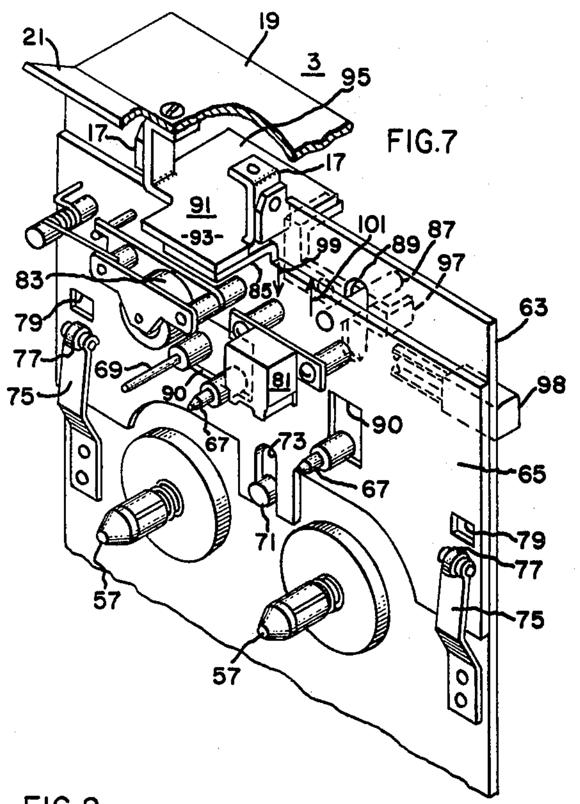
Figure 8:
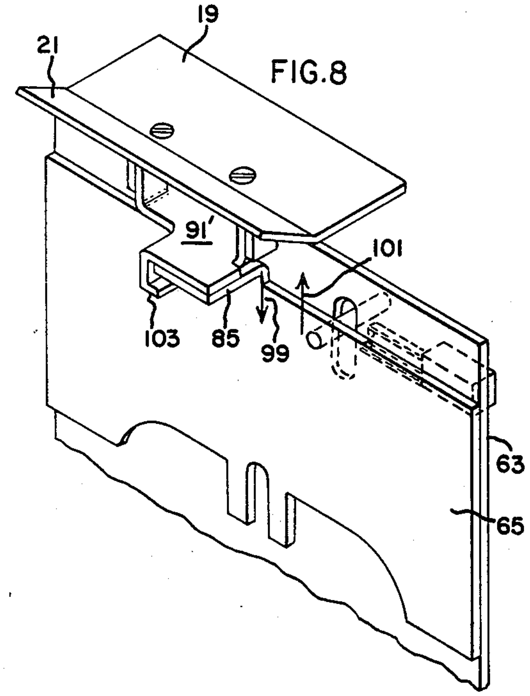
Figure 3:
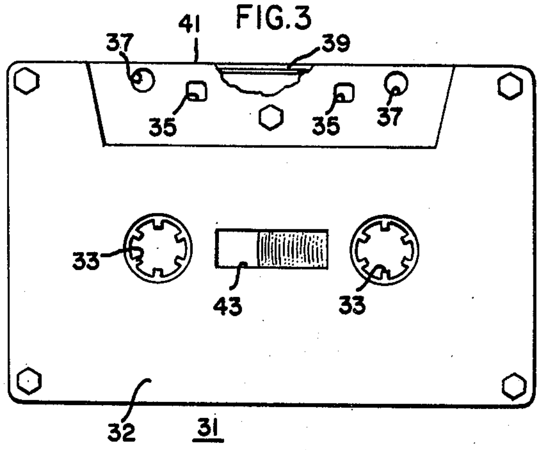

The novel and distinctive features of the invention are set forth in the appended claims, the invention itself together with further objects and advantages thereof, may best be understood by reference to the accompanying drawings in which:

FIGURE 1 is a front elevational view of the tape player of the invention with the handle assembly in the extended carry position, FIGURE 2 is a side elevational view of the tape player of the invention as shown in FIGURE 1, FIGURE 3 is a top view of a tape cartridge for use with the tape player of the invention, FIGURE 4 is a sectional view taken along the line 4—4 of FIGURE 2, FIGURE 5 is a front elevational view similar to FIGURE 1 but with the handle assembly in the fully retracted position, FIGURE 6 is a side elevational view of the tape player of the invention as shown in FIGURE 5, FIGURE 7 is a perspective view of one embodiment of a function switching mechanism suitable for use in the tape player of the invention, and FIGURE 8 is a simplified perspective view similar to FIGURE 7 of an alternative function switching mechanism.

Referring to FIGURES 1 and 2, there is shown a tape player in accordance with the invention including a cabinet shown generally at 1, a function switch shown generally at 3 and a retractable handle assembly shown generally at 5, the handle assembly being shown in the extended carry position.

The cabinet 1 comprises front and back wall portions 7 and 9 respectively, a pair of side wall portions 11 and top and bottom wall portions 13 and 15 respectively.

The function switch assembly 3 generally comprises a pivoted lever 17 terminating in a pair of diverging tab portions 19 and 21 corresponding to the "stop" and "play" functions respectively, the tab portions 19 and 21 being at a small angle to the perpendicular to the lever 17. The pivoted lever 17 controls the engaging and disengaging of the drive and playback mechanisms, e.g. a magnetic tape head and pinch roller (not shown in FIGURES 1 and 2) with the cartridge 31. In FIGURES 1 and 2 the function switch assembly is shown with the tab 21 (i.e. the "play" tab) depressed, the cartridge 31 thus being engaged.

The handle assembly 5 comprises a generally U-shaped frame including a handle member 23 and a pair of elongated side members 25. The handle assembly further includes a generally planar tape cartridge captivating member 27 spaced from and extending between the pair of side members 25 adjacent to the ends thereof. The member 27 is spaced from the elongated side members by transversely extending portions 29.

A conventional tape cartridge 31, shown most clearly in FIGURE 3, is positioned on the tape player with the cartridge captivating member 27 overlying and captivating the cartridge when the handle assembly is in the position shown in FIGURES 1 and 2.

The cartridge 31 shown in FIGURE 3 generally comprises a compact reel-to-reel type cartridge supported between a pair of spaced, generally planar body portions 32. The cartridge includes a pair of rotatable drive hubs 33, a pair of alignment holes 35, a pair of drive capstan receiving apertures 37, and a magnetic tape 39 passing adjacent an open side 41 of the cartridge, the open side 41 thereby permitting engagement of the tape by a magnetic tape head and pinch roller. The cartridge is, of course, adapted to drive the tape in either direction from a single capstan by reversing the position of the cartridge. A window 43 is provided in each of the spaced portions 32 to permit viewing of the tape reels to provide an indication of the relative amounts of tape on each reel.

Returning to FIGURES 1 and 2, an aperture 44 is provided in member 27 to permit viewing of the window 43 of the cartridge when the handle assembly 5 is in the extended carry position as shown.

The side wall portions 11 of the cabinet 1 are provided with tracks 45, each track 45 being adapted to slidably receive a pair of retaining pins 47 including track engaging flanges 49 as most clearly shown in the sectional view of FIGURE 5. The pins 46 are preferably affixed to the side portion 25 of the handle assembly 5 by threaded fasteners 51. Through use of the pins 47 in conjunction with tracks 45, the handle assembly 5 is slidably retractable in the direction of the arrow 53 from the position shown in FIGURES 1 and 2 to that shown in FIGURES 5 and 6.

Referring now to FIGURES 5 and 6, the handle assembly 5 is shown in the completely retracted position. In this position, the under surface of the handle portion 23 of the handle assembly 5 engages and depresses tab 19 (i.e. the "stop" tab) of function switch 3 to disengage the cartridge 31 from the deck by moving the tape head and pinch roller out of engagement with the cartridge thereby permitting removal of the cartridge without damage to the deck.

The front wall portion 7 of cabinet 1 is provided with a re-entrant well 55 adapted to receive the cartridge 31, the well including a pair of outwardly extending drive spindles 57 adapted to be received by the drive hubs 33 of cartridge 31 in driving engagement therewith. The re-entrant well 55 is also provided with a magnetic head and pinch roller (not shown in FIGURES 5 and 6) extending into the well through the upper wall 59 thereof, the magnetic head and pinch roller being adapted to be brought into engagement with the cartridge 31 by the action of the function switch 3.

As depicted in FIGURE 6, the re-entrant well 55 is adapted to first receive the lower edge of the cartridge 31, the cartridge then being rotated in the direction of the arrow 61 whereby the drive spindles 57 are received by the associated drive hubs 33 of the cartridge 31. In order to ensure that this sequence of cartridge insertion is followed, the width of the cartridge captivating member 27 of the handle assembly 5 is such that even when the handle assembly is in the completely retracted position the cartridge captivating member forms a lip partially overlying the re-entrant well. Thus, the bottom edge of the cartridge must first be inserted as shown in FIGURE 6. Accordingly, injury to the tape deck which might result from insertion of the top of the cartridge and subsequent rotation of the bottom is precluded.

Referring to FIGURE 7 there is shown a partial perspective view of a tape deck mechanism including the function switch 3 as shown in the previous figures. Like reference numerals are utilized to identify those elements common to the previous figures.

The mechanism shown in FIGURE 7 generally comprises a base plate 63 in conjunction with a slide plate 65 adapted to slide thereon.

The base plate 63 includes a pair of outwardly extending alignment pins 67 adapted to be received by the apertures 35 of the cartridge 31. The base plate further includes a capstan 69 driven by a suitable motor (not shown) and an outwardly extending guide pin 71 adapted to be received by a slot 73 in slide plate 65.

A pair of spring fingers 75 are secured to the base plate 63, each spring finger having a detent roller 77 at the end thereof adapted to be selectively received by a pair of apertures 79 on each side of the side plate. In this manner each roller 77 in conjunction with the selected aperture 79 serves as a detent to positively and accurately position the slide plate 65 relative to the base plate 63.

A magnetic tape head 81 and a pinch roller 83 spring biased towards the capstan 69 are secured to the slide plate 65 in conventional fashion.

The slide plate 65 further includes a transverse tab portion 85 extending from an edge thereof and elongated member 87 extending rearwardly through an aperture 89 in the base plate 63.

Suitable apertures 90 are provided in the slide plate 65 to receive the aligning pins 67 and capstan 69, the apertures 90 being sufficiently large to permit the slide plate to travel freely between the "stop" and "play" positions.

The pivoted lever 17 of the function switch assembly 3 terminates in a generally planar member 91 having a frontwardly extending portion 93 and a rearwardly extending portion 95. The frontwardly extending portion 93 is adapted to engage the transverse tab 85 whereas the rearwardly extending portion 95 is adapted to operatively engage a lever 97 pivotally connected to the rear of the base plate 63.

The free end of the lever 97 is adapted to engage the member 87 and an electrical switch 98 which controls the energization of the drive motor.

The operation of the mechanism of FIGURE 7 is such that when the "play" tab 21 of the function switch 3 is depressed from the "stop" position shown in FIGURE 7, the forwardly extending portion 93 of the planar member 91 engages the transverse tab 85 exerting a force in the direction of the arrow 99 on the slide plate 65, thereby causing the slide plate 65 and the associated pinch roller 83 and magnetic head 81 to move into the "play" position. In this position, the detent rollers 77 engage the associated apertures 79 to positively position the slide plate in the "play" position. Further, the end of the lever 97 operatively engages the switch to energize the drive motor and the associated capstan 69.

Thus, when a cartridge 31 as shown in FIGURE 3 is positioned on the deck with the drive spindles 57 received by the drive hubs 33, aligning pin 67 received by the alignment holes 35, and the capstan 69 received by one of the apertures 37, the tape 39 will be sandwiched between the pinch roller 83 and the driven capstan 69, the tape thereby being transferred from one reel to the other in conventional fashion. In this position, the magnetic head 81 is in engagement with the tape 39 and playback of the recorder program results.

When the handle assembly 5 is depressed to the position shown in FIGURES 5 and 6, the stop tab 19 is automatically depressed by the handle portion 23. More specifically, the rearwardly extending portion 95 of the planar member 91 exerts a force on the lever 97 causing the lever to pivot and exert a force in the direction of the arrow 101 on the member 87 thereby causing the slide assembly 65 to be returned to the position shown in FIGURE 7. Since the lever 97 no longer engages the switch 98 the drive motor is de-energized.

An alternative function switching mechanism similar to that of FIGURE 7 is shown in simplified form in FIGURE 8. In FIGURE 8, the details of the base plate and slide plate have been omitted for simplicity, but could in general be identical to those of FIGURE 7. However, in the embodiment of FIGURE 8, the lever 97 shown in the embodiment of FIGURE 7 has been eliminated. Rather, the planar member 91 is provided with a portion 103 overlying the bottom surface of the tab 85.

The operation of the embodiment of FIGURE 8 when the play tab 21 is depressed is similar to that of the embodiment of FIGURE 7. However, when the stop tab 19 is depressed the portion 103 of the planar member 91 exerts the requisite force in the direction of the arrow 101 on the tab 85 thereby moving the slide 65 to the position shown in FIGURE 7 and eliminating the necessity for the lever 97 of FIGURE 7.

Although the invention has been described with respect to certain specific embodiments, it will be appreciated that modifications and changes may be made by those skilled in the art without departing from the true spirit and scope of the invention. In particular, although a tape player has been described, the invention will find equal application in tape recorders where a "record" as well as a "play" capability is provided.

What is claimed and desired to be secured by Letters Patent of the United States is:

1. In a tape player which includes means for receiving a magnetic tape cartridge, the improvement which comprises:

(a) function switch means adapted to selectively engage the playback and drive mechanisms of the player with the cartridge and disengage said mechanisms of the player from the cartridge, (b) a carry handle assembly including a cartridge captivating portion, (c) said handle assembly being movable from an extended carry position to a retraced position, (d) said cartridge captivating portion of said handle assembly captivating the cartridge when said handle assembly is in other than the retracted position, and (e) said handle assembly operatively engaging said function switch means in the retracted position to disengage said mechanisms from the cartridge.

2. The improved tape player defined in claim 1 wherein said cartridge captivating portion of said handle assembly comprises a generally planar member overlying the cartridge when the handle assembly is in other than the retracted position.

3. The improved tape player defined in claim 2 wherein said tape player includes a main body portion and said handle assembly includes a generally U-shaped member slidably mounted to the main body portion.

4. The improved tape player defined in claim 3 wherein said main body portion includes a re-entrant well adapted to receive the cartridge, said generally planar portion of said handle assembly partially overlying said re-entrant well when said handle assembly is in the retracted position whereby said cartridge can only be inserted into said well in one direction.

5. The improved tape player defined in claim 3 wherein said main body portion includes track means and said U-shaped portion of said handle assembly includes means slidably retained in said track means.

6. The improved tape player defined in claim 1 wherein said function switch means includes a lever selectively pivotable into play and stop positions.

7. The improved tape player defined in claim 6 wherein said lever is provided with first and second diverging tabs, said first tab being depressed by said handle assembly when said handle assembly is in the retracted position.

8. The improved tape player defined in claim 7 wherein said player includes a magnetic tape head and pinch roller, said head and said pinch roller being brought into engagement with the tape cartridge when said second tab is depressed.

References Cited

UNITED STATES PATENTS

| | | |
|---|---|---|
| 3,400,936 | 9/1968 | Staar. |
| 2,712,448 | 7/1955 | Schroter. |

LEONARD FORMAN, Primary Examiner.

R. A. FIELDS, Assistant Examiner